United States Patent
Carlsson

(10) Patent No.: US 10,617,066 B2
(45) Date of Patent: Apr. 14, 2020

(54) SYSTEM AND METHOD FACILITATING GROWTH AND TRANSPORTATION OF PLANT LIFE

(71) Applicant: BALL HORTICULTURAL COMPANY, West Chicago, IL (US)

(72) Inventor: Kristopher Robert Carlsson, Nipomo, CA (US)

(73) Assignee: BALL HORTICULTURAL COMPANY, West Chicago, IL (US)

( * ) Notice: Subject to any disclaimer, the term of this patent is extended or adjusted under 35 U.S.C. 154(b) by 357 days.

(21) Appl. No.: 15/619,055

(22) Filed: Jun. 9, 2017

(65) Prior Publication Data

US 2018/0352751 A1    Dec. 13, 2018

(51) Int. Cl.
*A01G 9/12* (2006.01)
*B65D 85/52* (2006.01)

(52) U.S. Cl.
CPC ............... *A01G 9/12* (2013.01); *B65D 85/52* (2013.01)

(58) Field of Classification Search
CPC .......... A01G 9/12; A01G 9/122; A01G 9/124; A01G 9/126; A01G 9/128
See application file for complete search history.

(56) References Cited

U.S. PATENT DOCUMENTS

| | | | |
|---|---|---|---|
| 2,763,096 A | 9/1956 | Roger | |
| 3,299,569 A | 1/1967 | Lemrick | |
| 4,610,107 A * | 9/1986 | Testa | A01G 9/12 47/47 |
| 5,179,799 A | 1/1993 | Hillestad | |
| 5,640,802 A | 6/1997 | Elliott | |
| 9,167,755 B1 | 10/2015 | Kampman | |
| 9,565,808 B2 * | 2/2017 | King | A01G 9/12 |
| 10,433,495 B2 * | 10/2019 | Wimbush, Sr. | A01G 17/04 |
| 2005/0039394 A1 | 2/2005 | Kelly | |
| 2017/0035004 A1 * | 2/2017 | McMurray | A01G 9/12 |
| 2017/0359969 A1 * | 12/2017 | Slevkoff | A01G 17/06 |
| 2018/0168114 A1 * | 6/2018 | McMurray | A01G 17/06 |

FOREIGN PATENT DOCUMENTS

WO    WO-2006064828 A1 *    6/2006    ............... A01G 9/12

OTHER PUBLICATIONS

Retrieved from the Internet on Jan. 31, 2017: http://fredericmalphettes.com/chapo/11-projects/41-anno-1.html.

* cited by examiner

*Primary Examiner* — Kristen C Hayes
(74) *Attorney, Agent, or Firm* — Marshall, Gerstein & Borun LLP; Randall G. Rueth

(57) ABSTRACT

A system and method provide a foundation for a plant during growth and transportation.

13 Claims, 4 Drawing Sheets

SYSTEM AND METHOD FACILITATING GROWTH AND TRANSPORTATION OF PLANT LIFE

TECHNICAL FIELD

The present disclosure generally relates to systems and methods to facilitate growing and transporting a plant.

BACKGROUND

Transporting plants grown with the assistance of a vertical support such as a trellis may be cumbersome because of the vertical space necessary to accommodate the plant and its vertical support. Because the plant has often times become entwined with the support during growth, it may not only be difficult, but harmful to the plant to remove it from the support. It would therefore be beneficial for the support to be collapsible along with the plant so that the plant can be efficiently, safely, and more compactly assembled for shipment, and readily configurable for growth after delivery.

SUMMARY

A system and method provide a foundation for a plant during growth and transportation. In particular, a method to facilitate transportation of a plant grown in cooperation with a platform assembly having a base assembly and a chain with at least one segment. The base assembly includes a growth medium disposed within a container, wherein the chain is connectable with a support to buttress the plant during growth. The method includes suspending the chain over the base assembly to enable entwinement with the plant during growth of the plant; collapsing the chain and the entwined plant atop the base assembly; and assembling the base assembly, the collapsed chain, and the entwined plant for shipment.

Another embodiment to facilitate growth and transportation of a plant includes a platform assembly comprising a base assembly including a container holding a growth medium for the plant; a trellis assembly including a support and a chain, the support capable of removable connection with the base assembly, wherein the platform assembly includes: a growth configuration including the support removably attached to the base assembly, and the chain removably attached to the support and suspended above the base assembly to support growth and entwinement of the plant, and a transportation configuration including the support detached from the base assembly, and the chain detached from the support and collapsed with the entwined plant atop the base assembly to facilitate compact assembly and transportation of the base assembly, the collapsed chain, and the entwined plant.

A further embodiment to facilitate growth and transportation of a plant includes a platform assembly capable of cooperation with a support to buttress the plant during growth. The platform assembly comprises a base assembly including a growth medium disposed within a container; a chain including at least one segment and capable of entwinement with the plant, wherein the platform assembly includes: a growth configuration including the support removably connected to the base assembly, the chain removably connected to and suspended from the support for position above the growth medium and supporting entwinement of the plant during growth; and a transportation configuration including the support disconnected from the base assembly, and the chain disconnected from the support and collapsed with the entwined plant atop the base assembly for shipment.

BRIEF DESCRIPTION OF THE DRAWINGS

The figures described below depict various aspects of the system and methods disclosed therein. It should be understood that each figure depicts an embodiment of a particular aspect of the disclosed systems and methods, and that each of the figures is intended to accord with a possible embodiment thereof.

DETAILED DESCRIPTION

Implementing the techniques described below, a platform assembly provides a means for safely and effectively growing and transporting a plant. In general, the platform assembly is easily configurable between multiple configurations to support the plant during growth and transportation. Exemplary embodiments of the platform assembly and portions thereof are described in more detail below and in reference to FIGS. 1-7.

Figure 1:
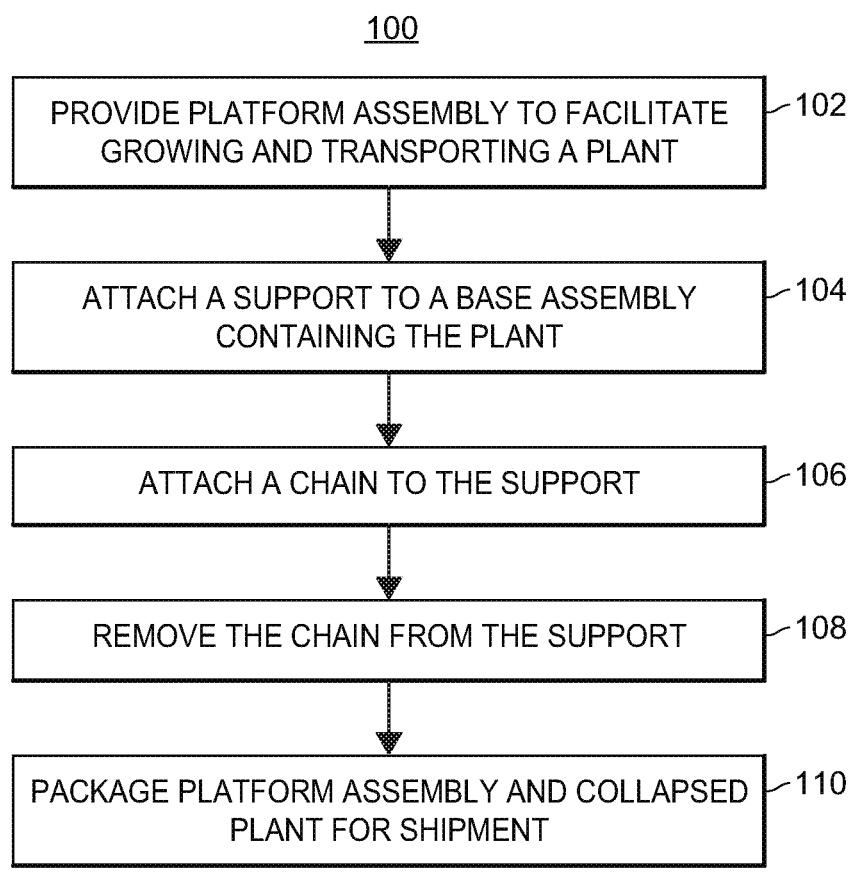
FIG. 1 illustrates a flow diagram of an exemplary method for facilitating growth and transportation of a plant in accordance with the presently described embodiments.

FIG. 1 depicts a flow diagram (100) of an exemplary method for facilitating growth and transportation of a plant rooted in a platform assembly (block 102). A support is attached to a base assembly (block 104). The base assembly includes a container and a growth medium contained within the container. A chain is removably attachable to the support (block 106). The chain includes at least one segment and when the platform assembly is configured in a growth configuration, the chain is attached to the support and suspended freely from a singular anchoring position above the growth medium and/or the base assembly. The length of the chain may be extended and reduced by adding or subtracting one or more segments, e.g., links. The segment(s) facilitates growth of the plant by providing structure for the plant to entwine. The segment may include various shapes and sizes and is capable of being removably attached to the support and/or another segment. To prepare the plant for shipment, the chain and entwined plant are permitted to collapse in a more compact transportation configuration atop the base assembly (block 108), wherein the base assembly, collapsed chain, and entwined plant may be gathered and assembled for placement in an area (e.g., pallet, cart, shelf) with less vertical space than needed when assembled in the growth configuration. Alternately, or additionally, the compacted base assembly, collapsed chain, and entwined plant may be assembled and packaged within a shipping container (e.g., box, bag) for transportation. Upon delivery of the shipped plant, the platform assembly described herein may be assembled into the growth configuration with the chain and entwined plant suspended from the support for future growth of the plant.

Figure 2:
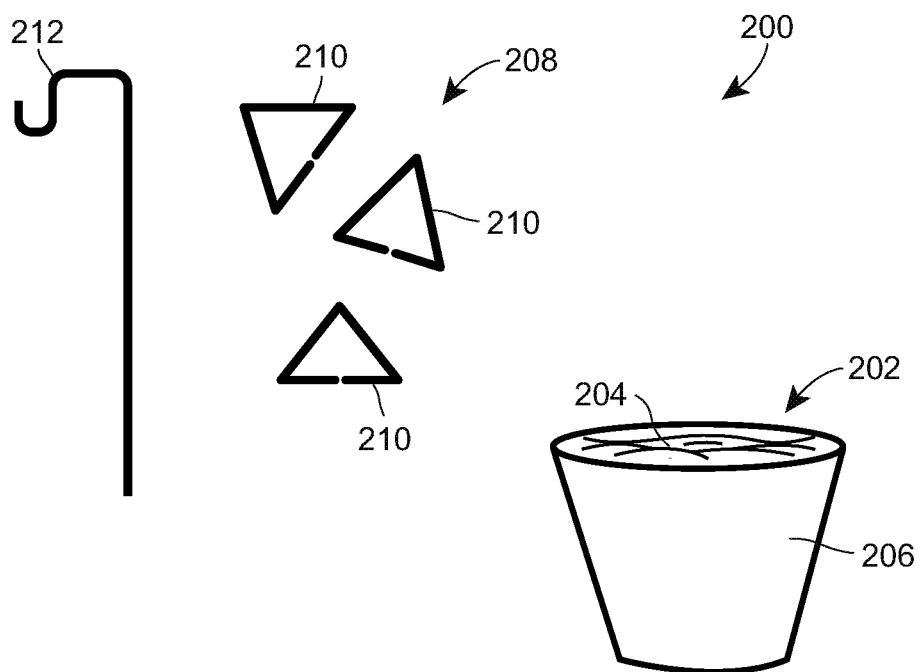
FIG. 2 illustrates a platform assembly and a support in accordance with at least one of the presently described embodiments.

FIG. 2 depicts various components of an example embodiment of the platform assembly 200 that may or may not include a support 212. For example, the platform assembly 200 includes a base assembly 202 and a chain 208 (shown unassembled with unlinked segments 210). The base assembly 202 includes a growth medium 204 for the plant disposed within a container 206. The growth medium 204 may include any type of "soil" or combination thereof, including and not limited to: top soil, sand, vermiculite, rocks, mulch, and a like. The container 206 may be of any shape and size sufficient for growing and transporting the plant, for example, round, square, rectangular, oval, diamond, etc., and small, medium, large, extra-large. The top edge of the container 206 generally resides within or is adjacent to a horizontal plane that is substantially parallel to a top surface of the growth medium 204. The chain 208 preferably includes at least one segment 210 or link. The segment 210 may be of various shapes and sizes and includes a vertical and horizontal dimension, and a coupler for coupling to another segment 210. In particular, the coupler facilitates removable coupling to another segment 210, and in some instances, to the vertical support 212. The support 212 is configured at one end for cooperative attachment to the base assembly 202, and at another end for cooperative attachment with the segment 210, which enables suspended removable connection of the chain 208 to the support 212 at a singular location. That is, the chain 208 is removably attached at only one location of the support 212; however, there may be multiple locations on the support for attachment with the chain. The support 212 and suspended chain 208 form a trellis assembly for the growing plant.

The support 212, which may or may not be included within the platform assembly 200, preferably includes a vertical and horizontal dimension to support and suspend the chain 208 substantially above the growth medium 204 and the container 206 of the base assembly 202 when the platform assembly is constructed in a growth configuration. The suspended chain 208 facilitates upward growth of the plant by providing structure for the plant to entwine, thus promoting vertical growth. The vertical growth of the plant may be aided by the horizontal portions of the one or more segments 210, which may promote plant-shoots to cling to the chain 208 and foster further growth.

Figure 3:
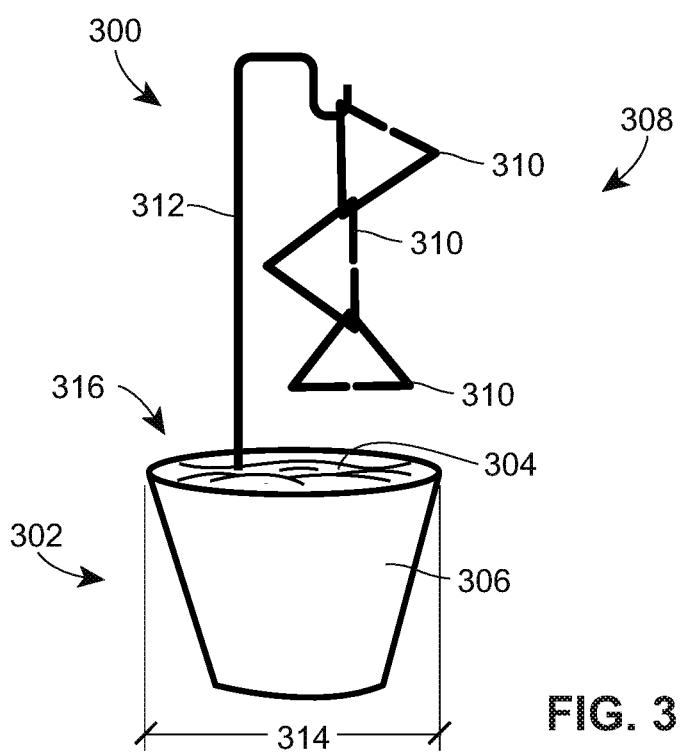
FIG. 3 illustrates an exemplary construction of a platform assembly and a support in accordance with at least one of the presently described embodiments.

FIG. 3 depicts an embodiment of an exemplary platform assembly 300 constructed in the growth or growing configuration in cooperation with the support 312. The chain 308 includes several interconnected segments 310, e.g., links, and is attached at a singular location to the support 312 and is freely suspended above the growth medium 304 disposed within the container 306 of the base assembly 302. A top surface 316 of the growth medium 304 lies substantially parallel with a plane defined by, containing, and/or proximate an upper perimeter (e.g., edge, lip, rim, etc.) of the container 306; and is substantially perpendicular to the vertical portion of the support 312 and/or the suspended chain 308 when configured in the growth configuration. See, for example, plane 716 of FIG. 7.

The chain 308 may be constructed of one or more segments 310 of similar or different shape and size. Each segment 310 includes a coupler for removable coupling to another segment and/or the support 312. The coupler may be integral with the segment 310 and may include an opening within the segment 310 that enables another segment 310 to be coupled thereto. The coupler may include a permanent and/or temporary opening. For example, the coupler of the segment 310 may include a permanent opening defined within the structure of the segment. A permanent opening may include a gap within the segment 310 that remains present unless a force is applied to the segment to fully or substantially enclose the segment. For example, the segment 310 may be comprised of malleable material (e.g., soft metal, polymer, plastic, fibrous, or otherwise) that permits movement of the segment 310 or a portion thereof to create the opening and close the opening. The opening may remain within the segment 310 during use of the chain 308 because closure of the opening may not adversely affect suspension of the chain 308 and/or entwinement with the growing plant.

Another embodiment of coupler of the segment 310 may include a temporary opening that allows for a discontinuation or break in a portion of the segment 310, but is capable of being manually closed, or biased to automatically close the opening. One example embodiment of a temporary opening includes a movable collar that can be positioned to temporarily open the segment 310 (e.g., normally closed) to expose the temporary opening of the segment. Examples of the coupler with the temporary opening include, and are not limited to, a movable pivot or latch similar to that used in a gated-carabiner, e.g., wire gate, straight gate, auto-lock gate (e.g., spring-biased), twist-lock gate. Another embodiment of the temporary opening includes a "split ring" commonly incorporated in a key-ring, wherein one segment 310 can be slid or fed along the biased split-opening (as typically accomplished when a key is attached to a key-ring) for eventual coupling with another segment 310.

The chain 308 of coupled segments or links 310 is capable of being connected to a singular location of the support 312. When connected to the support 312, the chain 308 is suspended to hang above the base assembly 302. The coupled segments 310 of the chain 308 need not be securely fastened together as is typically preferable for links of chains used for security purposes. The size and shape of the portions comprising the segment 310 facilitate climbing and entwining of the plant. When the chain 308 is suspended at a signal location from the support 312 to hang freely above the base assembly 302, each segment 310 generally includes one or more components or portions having a substantially vertical structural dimension and/or a substantially horizontal structural dimension. The vertical and horizontal structural dimensions of the segment 310 (when suspended as the chain 308 from the support 312) provide angles for the plant to climb onto and change direction while climbing, thus promoting a response within the plant for continued growth, quicker climbing, and entwining with the chain. The component or portion of the substantially vertical and horizontal structural dimensions of the segment 310 may include a cross-sectional distance or dimension, e.g., width, diameter, of 1/16, 1/8, or 1/4 inch. The cross-sectional geometry of the segment's component(s) includes a perimeter having a shape, for example, a circle, triangle, square, oval, polygon, etc.

Figure 4:
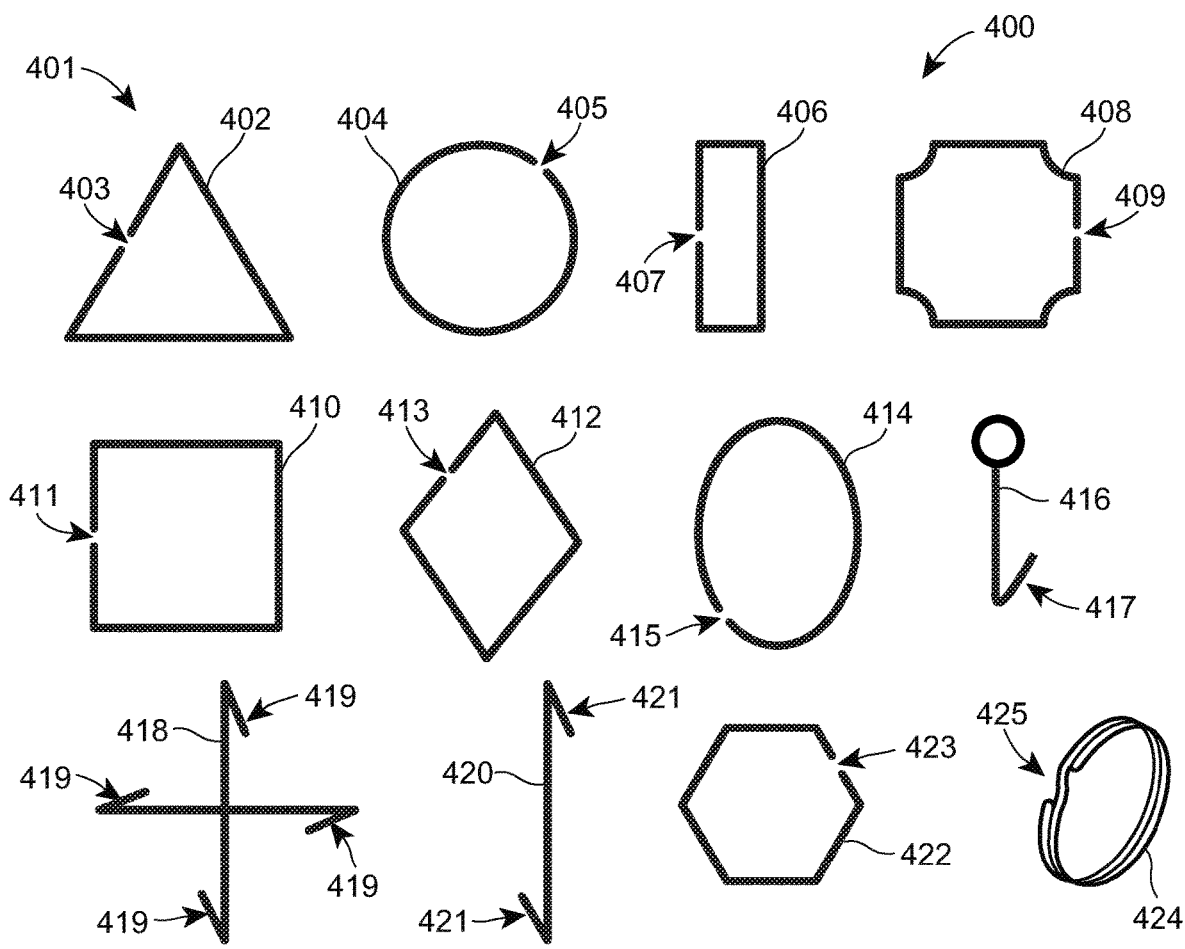
FIG. 4 illustrates some examples of a segment, e.g., link, of the chain in accordance with at least one of the presently described embodiments.

FIG. 4 illustrates some examples of the segment 401, which include, and are not limited to, a triangle 402, circle 404, rectangle 406, a notched-quadrangle 408, square 410, diamond (rhombus) 412, oval or ellipse 414, ring-hook stake 416, cross (X) 418, double-hook stake 420, hexagon 422, and key ring 424. Each segment 402, 404, 406, 408, 410, 412, 414, 416, 418, 420, 422, and 424 includes the coupler 403, 405, 407, 409, 411, 413, 415, 417, 419, 421, 423, and 425 for coupling to another segment. As described earlier, the coupler enables removable connection of one segment 401 to another segment, such as an opening, temporary or permanent, within the segment to facilitate interconnection with another segment and/or the support 312. For example, the coupler of the triangular segment 402 includes an opening 403, which permits a portion of an adjacent segment to pass there through, thereby enabling suspended interconnection of multiple coupled segments. Similarly, the circular segment 404 includes an opening 405, the rectangular segment 406 includes an opening 407, the notched-quadrangle segment 408 includes an opening 409, the squared segment 410 includes an opening 411, the diamond or rhombus segment 412 includes an opening 413, the oval or elliptical segment 414 includes an opening 415, the ring-hook stake segment includes an opening 417 (as well as a "closed" opening, e.g., ring), the cross (X) segment 418 includes an opening(s) 419, the double-hook stake segment 420 includes an opening(s) 421, and the hexagonal link 422 includes an opening 423. The coupler of the key-ring segment 424 includes a normally closed opening 425.

The coupler of the segment 401 may also be utilized to connect the segment to the support. For example, the support may include an open or closed structure, e.g., ring, for cooperative connection with the segment, wherein the coupler of the segment includes structure for removable connection to the support, such as an opening, temporary or permanent, for connecting to the support much the same as that described above with respect to connecting to another segment. Some examples of the coupler for connection to support include, and are not limited to openings 403, 405, 407, 409, 411, 413, 415, 417, 419, 421, 423, and 425 of the segments 401 shown in FIG. 4.

Figure 5:
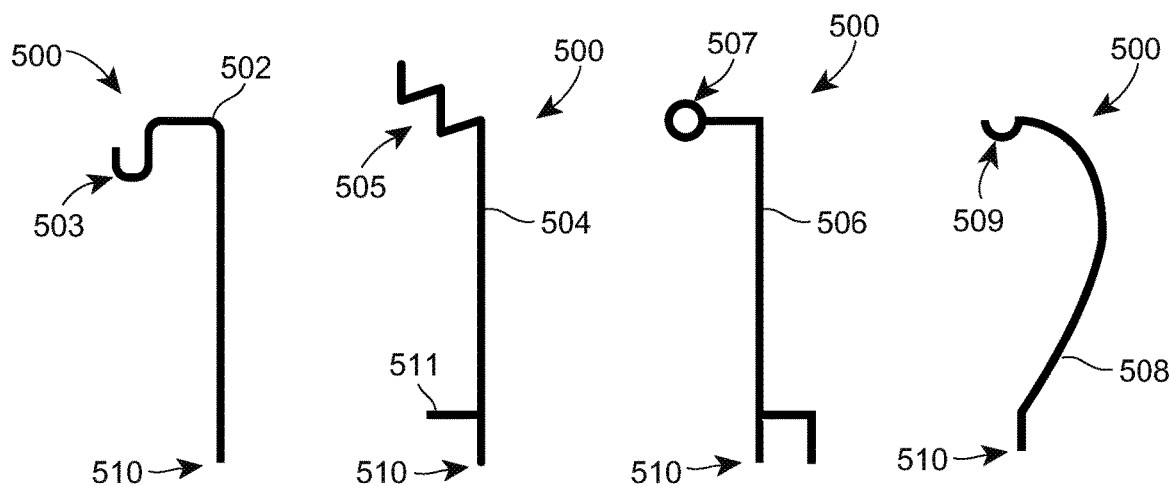
FIG. 5 illustrates some examples of a support in accordance with at least one of the presently described embodiments.

The support, which may or may not be included within the platform assembly, preferably includes a singular substantially vertical structural component. FIG. 5 illustrates some examples of the support 500 depicting various shapes including features for cooperative coupling with the segment and suspension of the chain. The support 500 includes a structure attached or integrated with a singular vertical component of the support for cooperation with the coupler of the segment. For example, the substantially vertical components or portions 502, 504, 506, 508 illustrated in FIG. 5, respectively include a U-shape 503, multiple V-shape 505, ring 507, and arc 509; each capable of cooperatively connecting with the coupler of the segment of the chain. The cooperating structure of the support 500 may include more than one shape and/or type, for example, the several U-shapes, V-shapes, rings, notches, arcs, etc., may be constructed within the support for multiple singular attachment locations with the chain, see for example, component or portion 505 in FIG. 5.

A base connector 510 removably connects the support and/or trellis assembly (formed by the vertical component of the support 500 and suspended chain) to the base assembly at a singular location. The singular location provides for safe, straightforward construction and deconstruction of the trellis assembly, wherein the singular substantially vertical component (e.g., 502, 504, 506, 508) of the support 500 may be more likely to be easier to untangle from the plant if the support had become entwined with the plant during growth. During preparation for transporting the plant with a known trellis, removal of known supports with multiple vertical components and multiple connection locations to the base assembly may increase the risk of damaging the plant. Additionally, upon receiving the transported plant and known trellis with multiple vertical components and multiple connection locations to the base assembly, reconstruction of the known trellis and platform assembly of the transported plant may require additional manipulation of the plant, which may likely increase the risk of damage the plant.

The singular base connector 510 is proximate an end of the support 500 and may be inserted into the growth medium or attached to the container of the base assembly. The single base connector 510 may include a stake, prong, spade, tine, etc., extending from the support 500 and capable of insertion into the growth medium of the base assembly. Alternatively, the singular base connector 510 may include a clamp capable of attaching to the container of the base assembly. The clamp may be biased (e.g., spring-loaded) and include, but not limited to, a clasp, clip, a ring, and a like. Alternatively, or additionally, the base connector 510 may include and/or cooperate with a receptacle implanted within the growth medium or integrated with the container that receives the base connector 510 of the support 500. For example, the receptacle may be an opening, similar to that of a stand for a banner or flagpole, attached to or integrated within the container, wherein the base connector 510 of the support 500 can be inserted and sufficiently supported within the receptacle when the platform assembly is constructed in the growth configuration for use during growth of the plant, and base connector 510 may be removed the receptacle when the platform assembly is constructed in the transportation configuration for shipment of the plant.

In one embodiment, the singular base connector 510 may include a footing 511 extending from the support 500 such that the footing is adjacent (e.g., substantially parallel) with the surface of the growth medium when the support 500 is positioned in the base assembly of the platform assembly configured in the growth configuration. The footing 511 cooperates with the growth medium to deter the support 500 from being moved from its substantially upright orientation when attached to the base assembly in the growth configuration. The footing 511 may be a tab or pad that extends (e.g., substantially perpendicular) from the support 500 proximate the base connector 510. The footing 511 deters further insertion of the base connector 510 into the growth medium past the footing 511 and provides additional support to prevent the portion of the support 500 that extends upward above the growth medium from movement. For example, when the footing 511 is positioned to generally extend toward the plant, the footing 511 cooperates with the growth medium to prevent the vertical portion of the support 500 from leaning toward the plant when the weight of the chain and entwined plant are suspended from the support. In some example embodiments, the footing 511 may include more than one component that extends in more than one direction from the vertical member of the support 500 proximate the base connector 510, for example, spaced at 60°, 72°, 90°, or 180° intervals. Additionally, the footing 511 may include a single component that extends in every direction, e.g., 360°, from the vertical member of the support in a disc-like fashion.

Figure 6:
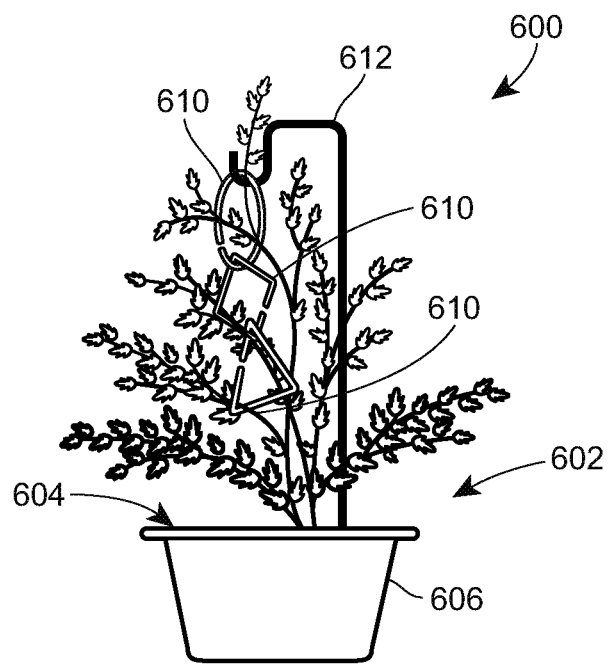
FIG. 6 illustrates an example embodiment of a growth configuration of the platform assembly in accordance with at least one of the presently described embodiments.
Figure 7:
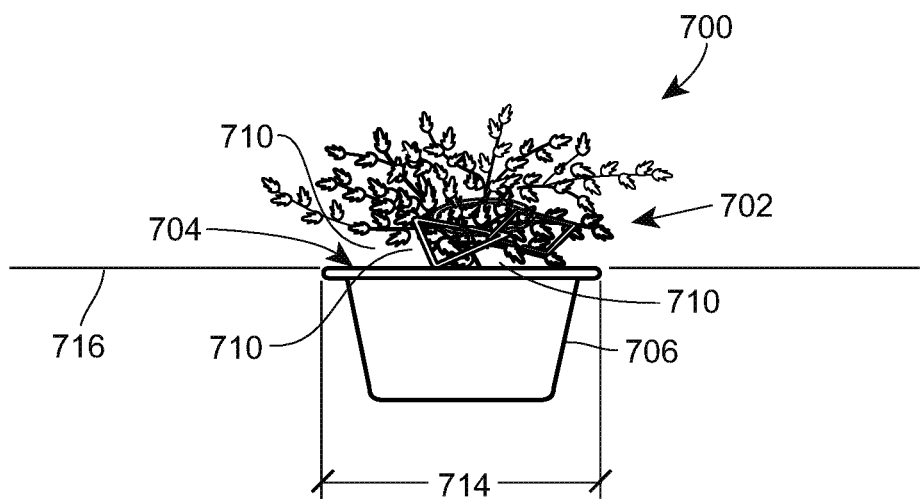
FIG. 7 illustrates an example embodiment of a transportation configuration of the platform assembly in accordance with at least one of the presently described embodiments.

Referring now to FIG. 6, an example of the platform assembly 600 is shown constructed in the growth configuration, wherein differently shaped segments 610 of the chain are suspended at a singular point from the support 612, which is implanted at a singular location within the growth medium 604 contained within the container 606 of the base assembly 602. In preparation of shipping the plant, the platform assembly can be configured in the transportation configuration shown in FIG. 7, wherein the chain and entwined plant have been detached from the support and permitted to collapse atop the growth medium 704 contained within the container 706 of the base assembly 702. The collapsed chain and entwined plant are capable of being positioned within the perimeter 714, e.g., circumference, of the container. In one embodiment where the chain and entwined plant have been collapsed, the segments 710 of the chain are of a size and shape capable of being be positioned within the perimeter 714 of the container 706 substantially defined within a plane 716 substantially parallel to the upper surface of the growth medium 704. The compact transportation configuration of the platform assembly with the collapsed chain and entwined plant reduces the vertical dimension of the space needed to transport the plant and lessens the susceptibility of potential damage to the plant as compared to transporting known platform assemblies with permanently erected trellises.

In view of the above description, plants supported by the collapsible trellis system described herein can quickly and safely be configured for growing and transporting. More plants configured with the collapsible/expandable trellis system described herein can be packaged and/or spaced within the same area than plants supported by conventional trellis systems. The singular connection point of the support to the base assembly (e.g., growth medium and/or container) provides for sufficient support of the suspended chain and entwined plant as well as simple and quick reconfiguration between the growth and transportation configurations of the platform assembly. Similarly, the singular connection point of the chain to the support provides for sufficient and adjustable support of the plant during growth, as well as a simpler, quicker, and safer reconfiguration between the transportation and growth configurations of the platform assembly with limited manipulation, thereby avoiding potential damage to the entwined plant.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Also, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Additionally, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the terms "consists," "consisting" or any other variation thereof, are intended to cover an exclusive inclusion. For example, a support consisting of single, sole, vertical member is limited to only those supports that include only a single vertical member.

This detailed description is to be construed as exemplary only and does not describe every possible embodiment, as describing every possible embodiment would be impractical, if not impossible. One could implement numerous alternate embodiments, using either current technology or technology developed after the filing date of this application.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A method to facilitate transportation of a plant grown in cooperation with a platform assembly having a base assembly and a chain with at least one segment, the base assembly including a growth medium disposed within a container, wherein the chain connectable with a support to buttress the plant during growth, the method comprising: suspending the chain over the base assembly to enable entwinement with the plant during growth of the plant; collapsing the chain and the entwined plant atop the base assembly; and assembling the base assembly, the collapsed chain, and the entwined plant for shipment.

Aspect 2: The method of aspect 1, further comprising; receiving shipment of the assembled platform assembly, the collapsed chain, and the entwined plant; and suspending the chain and the entwined plant over the base assembly.

Aspect 3: The method of any one of aspects 1-2, further comprising the support at a singular location of the base assembly; attaching the chain to the support, and removing the chain from the support.

Aspect 4: The method of any one of aspects 1-3, wherein the singular location is located on the container.

Aspect 5: The method of any one of aspects 1-3, wherein the singular location is located in the growth medium.

Aspect 6: The method of any one of aspects 1-5, further comprising packaging the assembled base assembly, the collapsed chain, and the entwined plant within a shipping container.

Aspect 7: The method of any one of aspects 1-6, further comprising adjusting a length of the chain by adding another segment to the chain or removing one of the at least one segment from the chain.

Aspect 8: A platform assembly for facilitating growth and transportation of a plant, the platform assembly comprising: a base assembly including a container holding a growth medium for the plant; a trellis assembly including a support and a chain, the support capable of removable connection with the base assembly, wherein the platform assembly includes: a growth configuration including the support removably attached to the base assembly, and the chain removably attached to the support and suspended above the base assembly to support growth and entwinement of the plant, and a transportation configuration including the support detached from the base assembly, and the chain detached from the support and collapsed with the entwined plant atop the base assembly to facilitate compact assembly and transportation of the base assembly, the collapsed chain, and the entwined plant.

Aspect 9: The platform assembly of aspect 8, further comprising a singular connector removably connecting the support at a singular location of the base assembly when the platform assembly configured in the growth configuration.

Aspect 10: The platform assembly of any one of aspects 8-9, wherein the singular location located on the container.

Aspect 11: The platform assembly of any one of aspects 8-9, wherein the singular location located in the growth medium.

Aspect 12: The platform assembly of any one of aspects 8-11, wherein the chain includes two or more segments, each of the two or more segments configured to removably couple to another segment and/or the support.

Aspect 13: The platform assembly of any one of aspects 8-12, wherein each segment sized to fit within an area defined by a perimeter of the container proximate an upper surface of the growth medium.

Aspect 14: The platform assembly of any one of aspects 8-13, wherein the support is extendable and retractable in length.

Aspect 15: A platform assembly facilitating transportation of a plant and capable of cooperation with a support to buttress the plant during growth, the platform assembly comprising: a base assembly including a growth medium disposed within a container; a chain including at least one segment and capable of entwinement with the plant, wherein the platform assembly includes: a growth configuration including the support removably connected to the base assembly, the chain removably connected to and suspended from the support for position above the growth medium and supporting entwinement of the plant during growth; and a transportation configuration including the support disconnected from the base assembly, and the chain disconnected from the support and collapsed with the entwined plant atop the base assembly for shipment.

Aspect 16: The platform assembly of aspect 15, further comprising a singular connector removably connecting the support at a singular location of the base assembly when the platform assembly configured in the growth configuration.

Aspect 17: The platform assembly of any one of aspects 15-16, wherein the singular location is located on the container.

Aspect 18: The platform assembly of any one of aspects 15-16, wherein the singular location is located in the growth medium.

Aspect 19: The platform assembly of any one of aspects 15-18, wherein the chain includes two or more segments, each of the two or more segments configured to removably couple to another segment and/or the support.

Aspect 20: The platform assembly of any one of aspects 15-19, wherein each segment sized to fit within an area defined by a perimeter of the container proximate an upper surface of the growth medium when the platform assembly is assembled for shipment.

We claim:

1. A platform assembly for facilitating growth and transportation of a plant, the platform assembly comprising:
   a base assembly including a container holding a growth medium for the plant;
   a trellis assembly including a support and a chain, the support capable of removable connection with the base assembly, wherein the platform assembly includes:
   a growth configuration including the support removably attached to the base assembly, and the chain removably attached to the support and suspended above the base assembly to support growth and entwinement of the plant, and
   a transportation configuration including the support detached from the base assembly, and the chain detached from the support and collapsed with the entwined plant atop the base assembly to facilitate compact assembly and transportation of the base assembly, the collapsed chain, and the entwined plant.

2. The platform assembly of claim 1, further comprising a singular connector removably connecting the support at a singular location of the base assembly when the platform assembly configured in the growth configuration.

3. The platform assembly of claim 2, wherein the singular location located on the container.

4. The platform assembly of claim 2, wherein the singular location located in the growth medium.

5. The platform assembly of claim 1, wherein the chain includes two or more segments, each of the two or more segments configured to removably couple to another segment and/or the support.

6. The platform assembly of claim 5, wherein each segment sized to fit within an area defined by a perimeter of the container proximate an upper surface of the growth medium.

7. The platform assembly of claim 1, wherein the support is extendable and retractable in length.

8. A platform assembly facilitating transportation of a plant and capable of cooperation with a support to buttress the plant during growth, the platform assembly comprising:

a base assembly including a growth medium disposed within a container;

a chain including at least one segment and capable of entwinement with the plant, wherein the platform assembly includes:

a growth configuration including the support removably connected to the base assembly, the chain removably connected to and suspended from the support for position above the growth medium and supporting entwinement of the plant during growth; and a transportation configuration including the support disconnected from the base assembly, and the chain disconnected from the support and collapsed with the entwined plant atop the base assembly for shipment.

9. The platform assembly of claim 8, further comprising a singular connector removably connecting the support at a singular location of the base assembly when the platform assembly configured in the growth configuration.

10. The platform assembly of claim 9, wherein the singular location is located on the container.

11. The platform assembly of claim 9, wherein the singular location is located in the growth medium.

12. The platform assembly of claim 8, wherein the chain includes two or more segments, each of the two or more segments configured to removably couple to another segment and/or the support.

13. The platform assembly of claim 12, wherein each segment sized to fit within an area defined by a perimeter of the container proximate an upper surface of the growth medium when the platform assembly is assembled for shipment.

* * * * *